US005477540A

United States Patent [19]
Yang et al.

[11] Patent Number: 5,477,540
[45] Date of Patent: Dec. 19, 1995

[54] FRAME REMOVAL MECHANISM USING END DELIMITER FRAMES FOR TOKEN RING NETWORKS

[75] Inventors: Henry Yang, Andover; K. K. Ramakrishnan, Maynard; Barry Spinney, Wayland; Rajendra K. Jain, Sudbury, all of Mass.

[73] Assignee: Digital Equipment Corp., Patent Law Group, Maynard, Mass.

[21] Appl. No.: 880,805

[22] Filed: May 8, 1992

Related U.S. Application Data

[62] Division of Ser. No. 678,888, Mar. 28, 1991, abandoned, which is a continuation of Ser. No. 577,828, Sep. 4, 1990, abandoned, which is a continuation of Ser. No. 483,296, Feb. 20, 1990, abandoned, which is a continuation of Ser. No. 231,773, Aug. 12, 1988, abandoned.

[51] Int. Cl.⁶ .................................................. H04L 12/433
[52] U.S. Cl. ........................................ 370/85.5; 370/85.15
[58] Field of Search ................................ 370/85.4, 85.5, 370/85.12, 85.13, 85.14, 85.15; 340/825.05

[56] References Cited

U.S. PATENT DOCUMENTS

| | | | |
|---|---|---|---|
| 4,468,734 | 8/1984 | Lanier et al. | 364/200 |
| 4,507,777 | 3/1985 | Tucker et al. | 370/16 |
| 4,567,590 | 1/1986 | Bederman | 370/86 |
| 4,577,313 | 3/1986 | Sy | 370/85.14 |
| 4,646,232 | 2/1987 | Chang et al. | 364/200 |
| 4,789,982 | 12/1988 | Coden | 370/85 |
| 4,941,142 | 7/1990 | Kida | 370/85.5 |

FOREIGN PATENT DOCUMENTS

| | | |
|---|---|---|
| 0119003A3 | 9/1984 | European Pat. Off. . |
| 0328004A1 | 2/1989 | European Pat. Off. . |
| 0354809A2 | 8/1989 | European Pat. Off. . |
| 3507618.6 | 9/1986 | Germany . |
| WO-A-9103898 | 3/1991 | WIPO . |

OTHER PUBLICATIONS

1988, Tanenbaum, A.S., *Computer Networks*, Second Edition, Vrije Universiteit, Amsterdam, The Netherlands, p. 16, Prentice–Hall, Inc., Englewood Cliffs, N.J. 07632.
1990, Stallings, Ph.D., W., *Handbook of Computer–Communications Standards, The Open Systems Interconnection(OSI) Model and OSI–Related Standards*, vol. 1, 2nd Edition, pp. 26–33.
1990, Stallings, Ph.D., W., *Handbook of Computer–Communications Standards, Local Area Network Standards*, vol. 2., 2nd Edition, pp. 181–185.
National Telecommunications Conference. vol. 1, Dec. 1981, New Orleans, La., US. W Bux et al. "A Reliable Token–Ring System for Local Area Communication" pp. A2.2.1–A2.2.1.
May 13, 1988, Memo to: IEEE 802–5 Voting embers by Jacalyn Winkler, 2 pages.

(List continued on next page.)

Primary Examiner—Douglas W. Olms
Assistant Examiner—Min Jung
Attorney, Agent, or Firm—David A. Dagg; A. Sidney Johnston

[57] ABSTRACT

A system for stripping frames transmitted by a station on a token ring network is disclosed. During operation of the system, the station receives a grant of permission to transmit onto the network. In an example embodiment, the grant of permission is a token. After receipt of the grant of permission to transmit, the station transmits one or more information frames onto the network. Upon transmission of the information frames, the station stops forwarding frames received from the network, thus removing received frames from the network. Removing received frames from the network is referred to as 'stripping'. Following transmission of the information frames, the station transmits an end strip delimiter frame onto the network. Upon receipt of the end strip delimiter frame, the station terminates stripping. In an example embodiment, the system is used in a bridge station, the bridge station connecting a first network with a second network.

8 Claims, 5 Drawing Sheets

OTHER PUBLICATIONS

May 20, 1988, Modifications to the IEEE 802.5 Standard to Include Early Token Release, by Jacalyn Winkler, 6 pages.

Dec. 1, 1987 Changes to the IEEE 802.5 Standard to Include Early Token Release, 3 pages.

Nov. 17, 1986, Enhancement to the Token Ring Protocol: Early Token Release, 5 numbered pages and 8 Figs.

1985, ANSI/IEEE Standard 802.5, 89+ pages.

Data Communications. vol. 13, No. 9, Aug. 1984, New York, N.Y. US, pp. 125–139; J. Bartik; "IBM's token ring: Have the pieces finally come together?"; see page 131, left–hand column, lines 3–13, see p. 135, left–hand column, line 17—p. 136, left–hand column, line 10.

K. K. Sy, IBM Technical Disclosure Bulletin, vol. 26, No. 11 Apr. 1984 pp. 5991–5992, Multipl Frame Transmission for Single Token.

FRAME REMOVAL MECHANISM USING END DELIMITER FRAMES FOR TOKEN RING NETWORKS

This is a divisional of application Ser. No. 07/678,888 filed on Mar. 28, 1991, now abandoned, which is a continuation of Ser. No. 07/577,828 filed Sep. 4, 1990, now abandoned, which is a continuation of Ser. No. 07,483,296 filed Feb. 20, 1990, now abandoned, which is a continuation of Ser. No. 07/231,773 filed Aug. 12, 1988, now abandoned.

BACKGROUND OF THE INVENTION

1. Field of the Invention

The invention relates generally to the field of computer networks comprising a plurality of stations which communicate data in a ring using a token-based protocol and more specifically to a mechanism for removing data from the network.

2. Description of the Prior Art

A computer network enables various devices, such as processors, mass storage devices, and printers, to communicate with each other over high speed communication links. The devices are connected, that is, interfaced, to the network, and thus transfer data to and from the network, through stations. The stations are interconnected by the communication links.

One example of such a network is a Local Area Network (LAN). A LAN allows high-bandwidth communication among devices within a limited geographic area. The communication links are typically composed of fiber optics, coaxial cable or twisted conductor pairs.

LAN's may be configured using of a number of topologies, for example, buses or rings. In a network configured as a bus, data is communicated in either direction from the originating station. In a network configured as a ring, network stations transmit data around the ring in one direction. Thus when a station transmits data onto the ring the data travels around the ring from station to station, with each station receiving the data from the preceding station and repeating it to the succeeding station, until the data reaches the station that is to receive it. In a well-known ring network the receiving, or destination, station also repeats the data to its downstream successor and the data thus continues around the ring to the originating, or source, station.

Network stations transmit and receive data in the form of frames. The frames contain, in addition to the data, addresses, an error detection sequence and status flags, for example, a flag indicating receipt of the frame by the intended receiving, or destination, station. The frame addresses identify the source station and the destination station or stations.

Every station and every attached device are each identified by a unique address. Thus each station has associated with it its unique station-address and the addresses of its attached devices. The stations may have other addresses, for example, logical addresses, associated with them, also. A frame directed from a source station to a single destination station thus contains the address of the source station and, for example, the address of a specific device attached to the destination station. Each station may maintain a list of its associated addresses, such that the station receives the frames containing any one of its addresses.

A destination station, in addition to repeating the frame to its succeeding station, copies the frame for use by the appropriate device(s) associated with the station. The destination station may also set the applicable status flags indicating receipt of the frame.

When the frame has returned to the source station, the station, recognizing the source address in the frame as its own, removes, or strips, the frame from the ring data stream. After a transmission, the first frames received by the source station over the ring are the frames it transmitted, assuming proper operation of the stations on the ring.

The stations operate in accordance with communication protocols which facilitate the orderly transfer of the frames over the communication links. One type of communication protocol is a token-ring system. Such systems use a token, that is, a specific string of bits, to indicate that a transmitting station has completed its transmission. A succeeding station may then, following the dictates of the protocol, begin transmitting frames upon receipt of the token.

In a token-ring system a station may not transmit data over the ring unless it holds the token. Thus if a station has frames to transmit around the ring it first removes the token from the ring data stream, that is, it "captures" the token, when it receives it from the preceding station. The capturing station then begins its frame transmission. When the station is finished with the frame transmission it retransmits the token, effectively releasing it. The succeeding stations thereafter transfer the token around the ring until a station captures it in order to make a transmission.

Two or more such rings, or more generally, two or more LAN's, may be connected by a bridge, that is, a special purpose station simultaneously connected to both LAN's, to form an extended LAN. The bridge thus facilitates communication between a transmitting station on, for example, one of the rings and a receiving station on another ring. It essentially acts as the destination station on the ring containing the transmitting station and thus copies the frames directed to a second ring, while also repeating these frames on the source station ring. It also acts as a transmitting station on the second ring and transmits the copied frames in that ring after capturing the ring's token. The second ring may contain the destination station, or it may be an intermediate ring which contains a bridge to another LAN, which may, in turn, contain the destination station or be another intermediate LAN.

There are two methods of bridge operation, namely, transparent and non-transparent. A bridge operating transparently transmits the frames originated by the source station without significantly altering them, that is, without changing any portion of the frame which is protected by the frame's error detection sequence. Alternatively, a bridge operating non-transparently significantly alters the frames originated by the source station before transmitting them to the connected LAN. A non-transparent bridge may, for example, alter the source address to the address of the bridge on the second ring and/or it may alter certain other information in the frame.

The non-transparent bridge must recalculate and replace the error detection sequence contained in each of the frames to prevent the frame alterations from being treated as errors. However, if the bridge incorrectly copies a frame or inadvertently copies an erroneous frame, alters it and then recalculates the error detection sequence, it may render the frame errors undetectable. The integrity of the frame information is considered to be thus reduced.

The bridge, regardless of the mode in which it operates, must strip from the second ring the frames it transmits. Typically, a station "recognizes" the source address in that frame as its own address and strips the frame. A bridge which leaves the addresses unaltered, and which is not the original source station, may not recognize the source address in the frames it has transmitted over the second ring. The bridge is capable of transmitting frames which were originally transmitted by one of many source stations on one or more different LAN's. When the frames return to the bridge over the second ring, it may not have time to compare the frame source address with the addresses of the many source stations on the various LAN's before the decision to strip the frame must be made. Thus the bridge could repeat a frame that should be stripped by it. Accordingly, there must be a method for a bridge to determine which frames to strip.

One possible method for stripping such frames involves the bridge marking the last frame in the sequence of transmitted frames, e.g., by setting a flag in the frame. The bridge then, after a transmission, strips the frames it receives over the ring until it detects the set flag in one of the frames. If, however, the frame containing the flag is lost or corrupted, making the set flag undetectable, the bridge may continue to strip the frames it receives over the ring until it is signalled to stop, for example, by the expiration of a locally kept timer. The bridge thus strips frames originated by other stations on the extended LAN, preventing the frames from reaching their intended destinations. If the flag is a single-bit flag, a bit-error in the frame may result in the flag appearing re-set, and thus, the bridge will stop stripping before it has removed all of its frames.

A non-bridge station which connects many devices to the LAN may also have problems determining which frames it should strip. A station must determine whether to strip a frame within the time it takes the frame addresses to pass through the station. Thus the station may not have time to match the frame source address with one of its many associated addresses, and another method for determining which frames to strip must be used.

SUMMARY OF THE INVENTION

The invention provides a new and improved station and a method for enabling the station to strip the frames it transmits.

In brief summary, a station incorporating the invention transmits a sequence of one or more frames on a ring, without setting any flags in the frames, and keeps a count of the frames transmitted. At the end of the transmitted sequence it also originates on to the ring one or more coded marker frames. After the transmission is begun, the station strips from the ring the frames it receives, decrementing its count for each properly stripped frame, until either its count is reduced to zero or one of its marker frames is detected.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
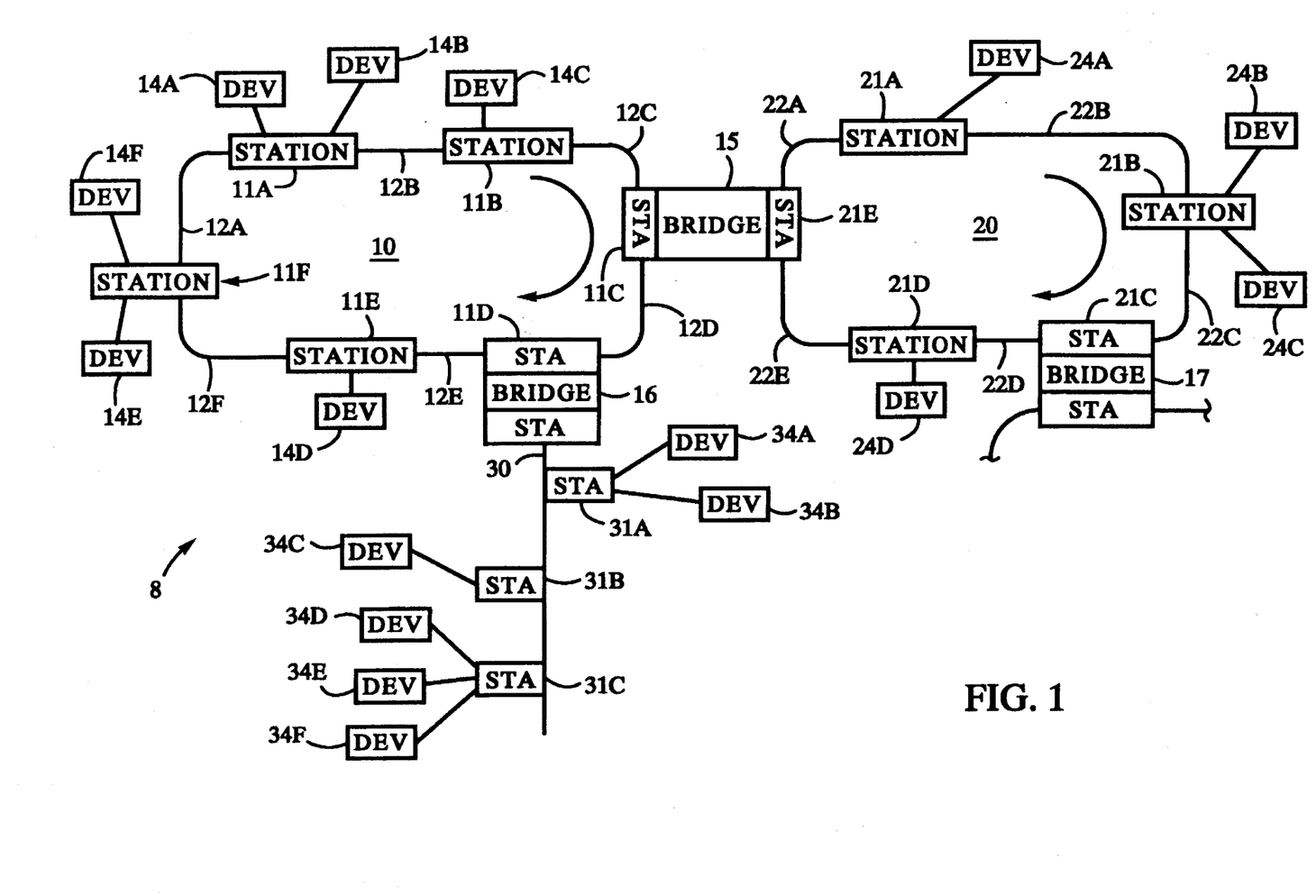
FIG. 1 depicts a functional block diagram of an extended LAN.

With reference to FIG. 1, a ring 10, that is, a LAN configured in a ring topology, includes a plurality of stations 11A through 11F connected by communication links 12A through 12F. The stations 11 interface one or more devices 14A through 14F to the ring. The devices 14 may be of diverse types, including computers, mass storage devices, telecommunications links, printers, and so forth, all of which may transmit information to, or receive information from, other devices in the ring 10 over communication links 12.

Similarly a ring 20 includes a plurality of stations 21A through 21E interconnected by communications links 22A through 22E, and bus 30 includes a plurality of stations 31A through 31C. Each of the stations 21 and 31 connects one or more devices identified generally as 24 or 34 to the ring 20 and bus 30, respectively.

Ring 20 is interconnected with ring 10 by a bridge 15. It is also interconnected by a bridge 17 to another network (not shown). The bridges are special purpose stations that are simultaneously stations on each of the LAN's they interconnect. Bridge 16 interconnects bus 30 with ring 10, thus stations on ring 20 can also communicate with stations on bus 30 via ring 10 using both bridges 16 and 15. The interconnected networks together form an extended LAN 8.

The stations 11 and 21, including the bridge-stations, transmit information over the respective communications links 12 and 22 in the form of frames, the structure of which will be described below in connection with FIG. 2. Communication between two stations on the same ring occurs when, for example, one station 11 transmits a frame to another station 11. To accomplish this, the station 11 originating the frame transmits a signal comprising a bit stream forming the frame to another station 11 (following the direction of the arrow) over the communications link 12 interconnecting the two stations. The station 11 that receives a bit stream from the originating station 11 repeats the frame over the communications link 12 interconnecting it and the next station 11.

This process is repeated by each of the other stations 11 until the frame is returned to the originating station 11. Essentially, each of the stations receives a signal over a communications link 12 interconnecting it and a preceding station 11, and transmits a signal over another communications link 12 interconnecting it and a succeeding station 11. If a station 11 is an intended recipient of the frame, in addition to repeating the frame to its downstream station 11, it also retains a copy of the frame for processing by one or more of the devices 14 connected to it.

The determination of whether a station 11 or 21 may transmit a frame to a ring is based on whether the station holds a token. A token is a special sequence of bits which the stations transmit around the ring. If, for example, station 11 is to send a frame, when the token reaches it, it does not repeat the token, thereby capturing the token and becoming its holder. The station 11 then transmits one or more frames. After completing the transmission of these frame(s), the station 11 resumes transmission of the token around the ring in accordance with the ring protocol, effectively releasing it to other stations on the ring.

When a station 11 receives a frame which it originated, other than the token, it strips the frame from the ring 10. Thus a frame is transmitted around the ring, that is, repeated from station to station, only once. If the originating station does not strip one of its frames, the intended destination station may receive duplicates of the frame. The destination station receives these duplicate frames at a faster rate than it ordinarily receives frames. Thus the station must process these frames more quickly, resulting in additional station overhead and possibly station errors.

Communication between two stations on different rings, for example, a station 21 on ring 20 and a station 11 on ring 10, is accomplished using the bridge 15. The bridge 15 acts as the intended receiving station on ring 20 and copies the frame as well as repeating it to the next station 21. The bridge 15 then transmits the copied frame on ring 10, after it captures the ring 10 token, and the intended receiving station 11 may then copy the frame when it receives it over the ring 10. After the frame is transmitted around ring 10 it is received by the bridge 15 and the bridge 15 then strips it. The operation of the bridge 15 is discussed in more detail with reference to FIGS. 3A–3C below.

Figure 2:
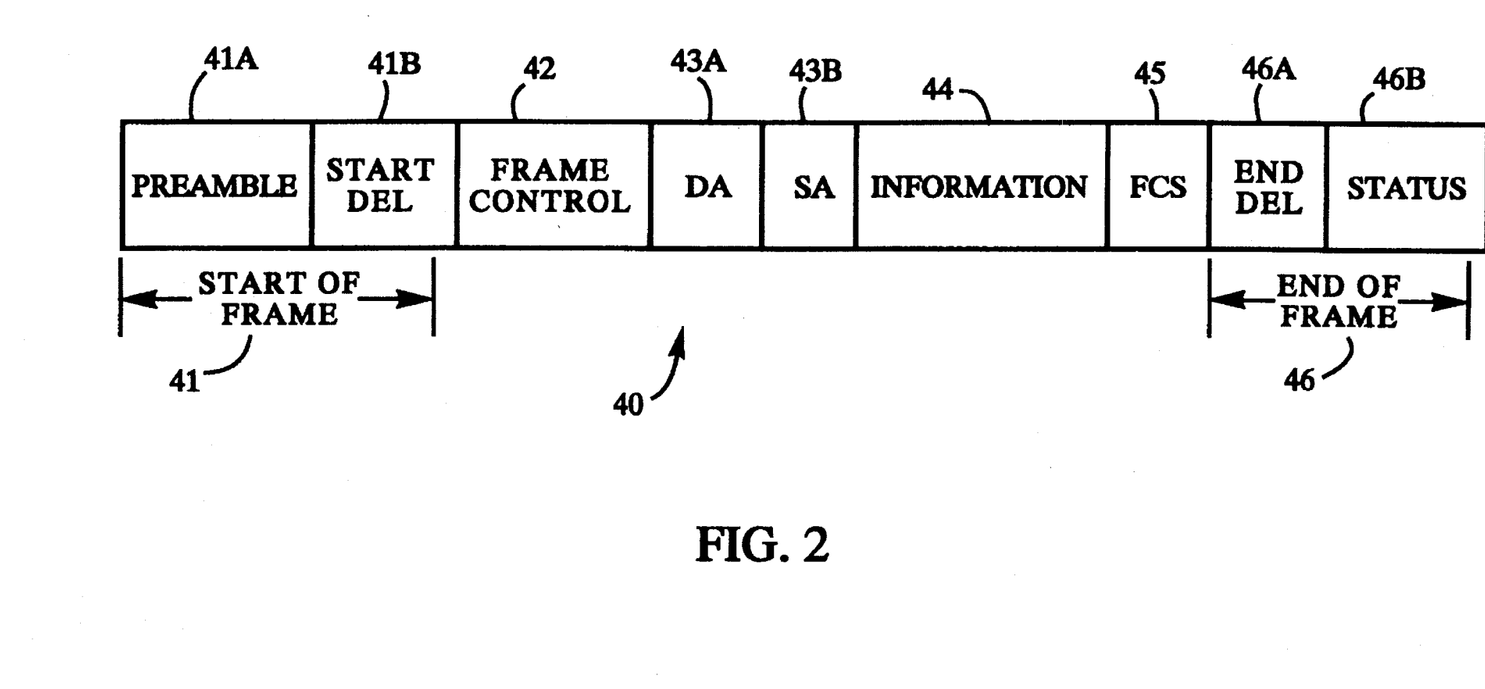
FIG. 2 depicts an illustration of an information frame used in the extended LAN shown in FIG. 1.

As noted above, information is transferred in the form of frames, the structure of which is shown in FIG. 2. With reference to FIG. 2, a frame 40 is divided into several fields. The start of a frame is denoted by a preamble field 41A and a start frame delimiter field 41B which further denotes the beginning of the portion of the frame containing the frame information. These fields are generally referred to as a start-of-frame sequence 41.

Immediately following the start-of-frame sequence 41 is a frame control field 42 detailing whether the bit stream is a token or a frame and, if it is a frame, indicating the type of frame, for example, an information frame. The next two fields are address fields 43A–B, namely, a destination address field DA 43A whose contents identify the intended recipient(s) of the frame and a source address field SA 43B whose contents identify the source station. The information field 44 follows the address fields 43, and is in turn followed by a frame check sequence field 45 containing an error detection sequence used by receiving stations to detect errors in any of the frame control field 42, the address fields 43 and the information field 44.

The end of the frame is denoted by an end-of-frame sequence 46. The sequence 46 includes an end delimiter field 46A, which defines the end of a frame, and a frame status field 46B containing a set of status flags. The status flags are conditioned by stations other than the source station to provide status information to the source station. This information may include, for example, whether the frame was copied by the intended destination station(s), whether any errors have been detected, etc.

If a station 11 or 21 recognizes the contents of the frame destination address field 43A as one of its own addresses, that is, either its station-address or one of its other associated addresses, it copies the frame for processing by its attached devices 14 or 24. It also repeats the frame to the next station in the ring as set forth above.

When a frame returns to its source station, the latter recognizes the contents of the frame source address field 43B as its own address, and strips the rest of the frame from the ring. When a frame is thus stripped, the start-of-frame sequence 41, the frame control field 42 and part of the address fields 43 remain. These fragments are ignored by the stations on the ring because they do not form a complete frame. They are stripped from the ring when they encounter a station in the act of transmitting.

If a ring is improperly operating, for example, if the token is lost or a break develops in the ring, the stations 11 and 21 begin operating in an error detection and recovery mode defined by the network protocol. The error detection and recovery mode may require all stations to actively participate or it may require the participation of only a few of the stations. Two widely used network protocols include error detection and recovery techniques involving the use of special-purpose frames, namely claim token frames and beacon frames.

The claim token frames are used when the ring is initialized or when the ring token is lost and the ring must thus be re-initialized. Basically, each station 11 and 21 has associated with it a priority for error detection and recovery purposes. When the token is lost each station continuously transmits claim token frames containing its priority until it receives another station's claim token frame. The receiving station then compares the priority in the frame with its own priority, and if the station has a lower priority than that contained in the frame it repeats the frame. Otherwise, it strips the frame from the ring and transmits another of its own claim token frames. When a station receives its own claim token frame, which indicates that the station has the highest priority, it originates the network token.

The beacon frames are used when a break in the ring or a substantial ring reconfiguration is suspected. Basically each station continuously transmits its own beacon frames to downstream stations. A downstream station, upon receipt of a beacon frame, stops transmitting its own beacon frames and repeats the received beacon frames to its successor station. When a station receives it own beacon frames, it is assumed that the network is properly configured and ring re-initialization, involving the use of the claim token frames as described above, is begun.

The detailed operation of the bridges 15–17 will now be described in connection with flow charts in FIGS. 3A–3C. The operations may be performed using hardware, software and/or firmware. It will be appreciated by those skilled in the art that non-bridge stations connecting a number of attached devices to the LAN operate in a manner which is similar to that of a bridge. Thus much of the discussion below relating to bridges applies, as well, to any station on the network.

Figure 3A:
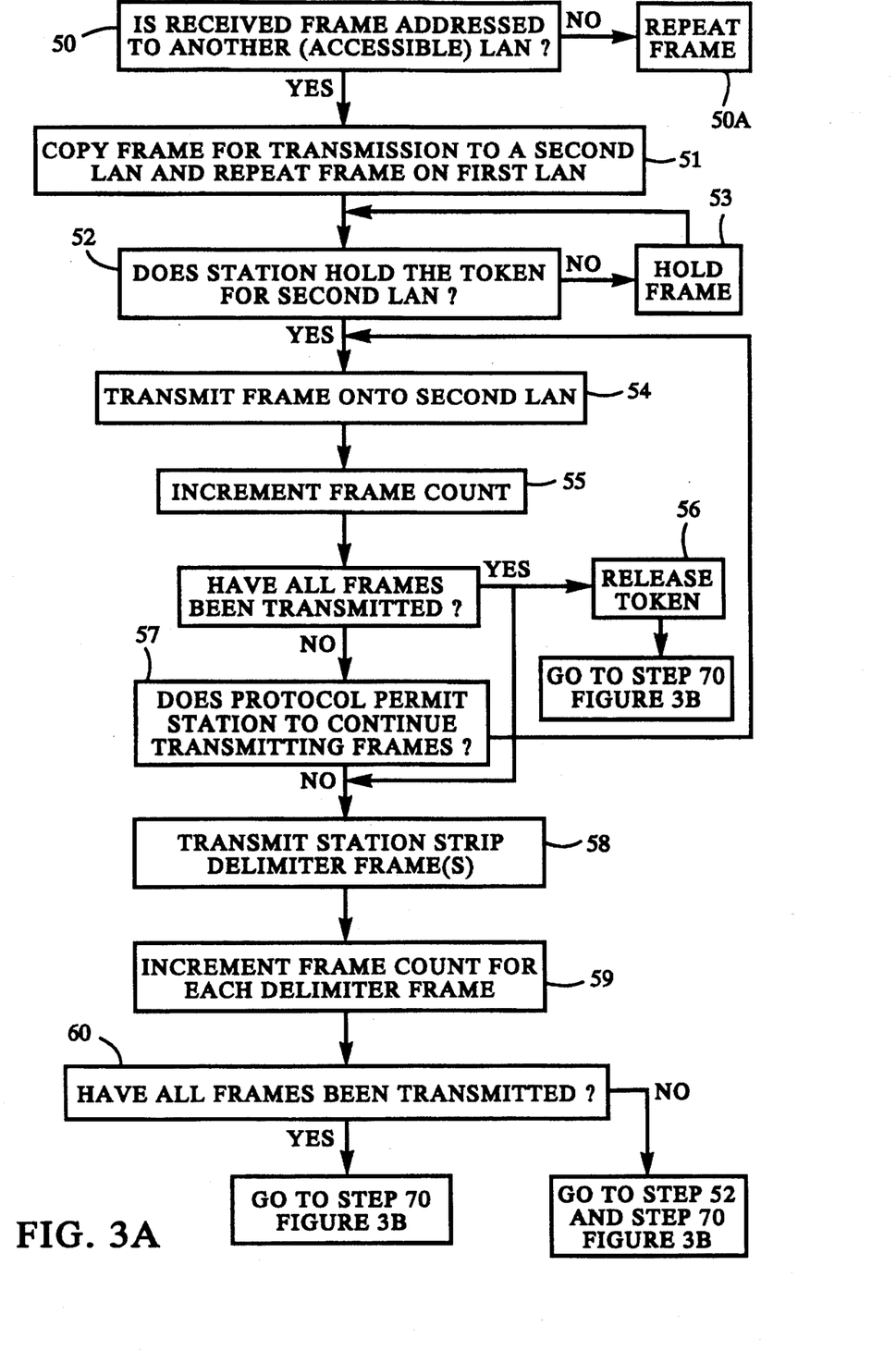
FIGS. 3A–3C comprise a flow chart depicting the operation of bridges on the extended LAN shown in FIG. 1 operating in accordance with the preferred embodiment.

With reference to FIG. 3A, a bridge, for example bridge 15, detecting a frame 40 originating on, for example, ring 10, determines if the intended destination station is on another LAN which is accessible from the bridge (step 50). If it is, the bridge 15 retains a copy of the frame 40 for transmission to the connected LAN, ring 20, and then repeats the frame on ring 10 (step 51). Alternatively, the bridge 15 may discern if the intended destination station is on ring 10 and, if it is not, copy the frame for transmission to the connected LAN, while repeating it on the ring 10.

After the bridge 15 copies one or more frames, it transmits the copied frames onto the ring 20 once it captures the ring 20 token (steps 53–54). The bridge 15 continues to transmit copied frames onto the ring 20 until either all the copied frames it holds for transmission on ring 20 are transmitted or it is forced by network protocol rules to stop transmitting and release the ring 20 token (steps 56–57). If the bridge 15 has not transmitted all of the copied frames before it ends the current transmission, it resumes transmission of copied frames when it again captures the ring 20 token (step 60).

Each time the bridge 15 transmits a frame onto ring 20 it increments an internal frame count by one (step 55), essentially keeping a running count of the number of frames transmitted. The count may be so incremented either at the beginning of the frame, for example, when the start frame delimiter field 41B (FIG. 2) is transmitted, or at the end of the frame, for example, when the end delimiter field 46A is transmitted.

At the close of the bridge's transmission of frames over the ring 10, the bridge 15 transmits onto the ring 20 one or more marker, or strip delimiter, frames marking the end of the transmission, incrementing the frame count by one for each of these frames (step 59). The count need not be incremented for these frames. However, in the preferred embodiment it is so incremented to keep an exact count of the frames transmitted by the bridge 15.

The strip delimiter frames are coded information frames specifying at least the frame type, that is, delimiter frame, the address of the originating bridge station, and the frame status, making each frame a full, or valid, frame. The number of strip delimiter frames transmitted is determined by the bridge 15. Redundant strip delimiter frames may be used to ensure that at least one delimiter frame will be transmitted around the ring 20 and returned to the bridge 15, thus giving the network a certain immunity to error. For further impunity to errors, the strip delimiter frames may be protected by a frame check sequence 45 (FIG. 2). Using the frame check sequence enables the source station to determine if the delimiter frame contains any errors. Errors in the frame may indicate a problem with one or more of the network stations and, as discussed below with reference to FIGS. 3A–3C, indicate to the source station that it is to continue stripping.

It will be appreciated by those skilled in the art that the frame stripping operation by a bridge, or any source station, must be quickly performed. As set forth above, a station typically determines whether or not to strip a frame by looking at the frame source address field 43B. If the field contents match one of the addresses associated with the station, it strips the frame. If the bridge 15 had to compare the contents of the frame source address field 43B with, for example, the addresses of stations originating frames transmitted by the bridge to determine whether to strip the frame, the bridge 15 would require very fast, and therefore expensive, processors and memories. The same is true for any stations which have many associated addresses, for example, stations which attach a relatively large number of devices to the network. The inventive bridges 15–17 and stations 11 and 21 use their internal frame counts and strip delimiter frames to determine which frames to strip, and thus they can use relatively simple circuitry and state machines, to determine when to start stripping frames. i.e., when the frame count is non-zero, and when to stop stripping frames, as discussed below with reference to FIGS. 3A–C.

Figure 3B:
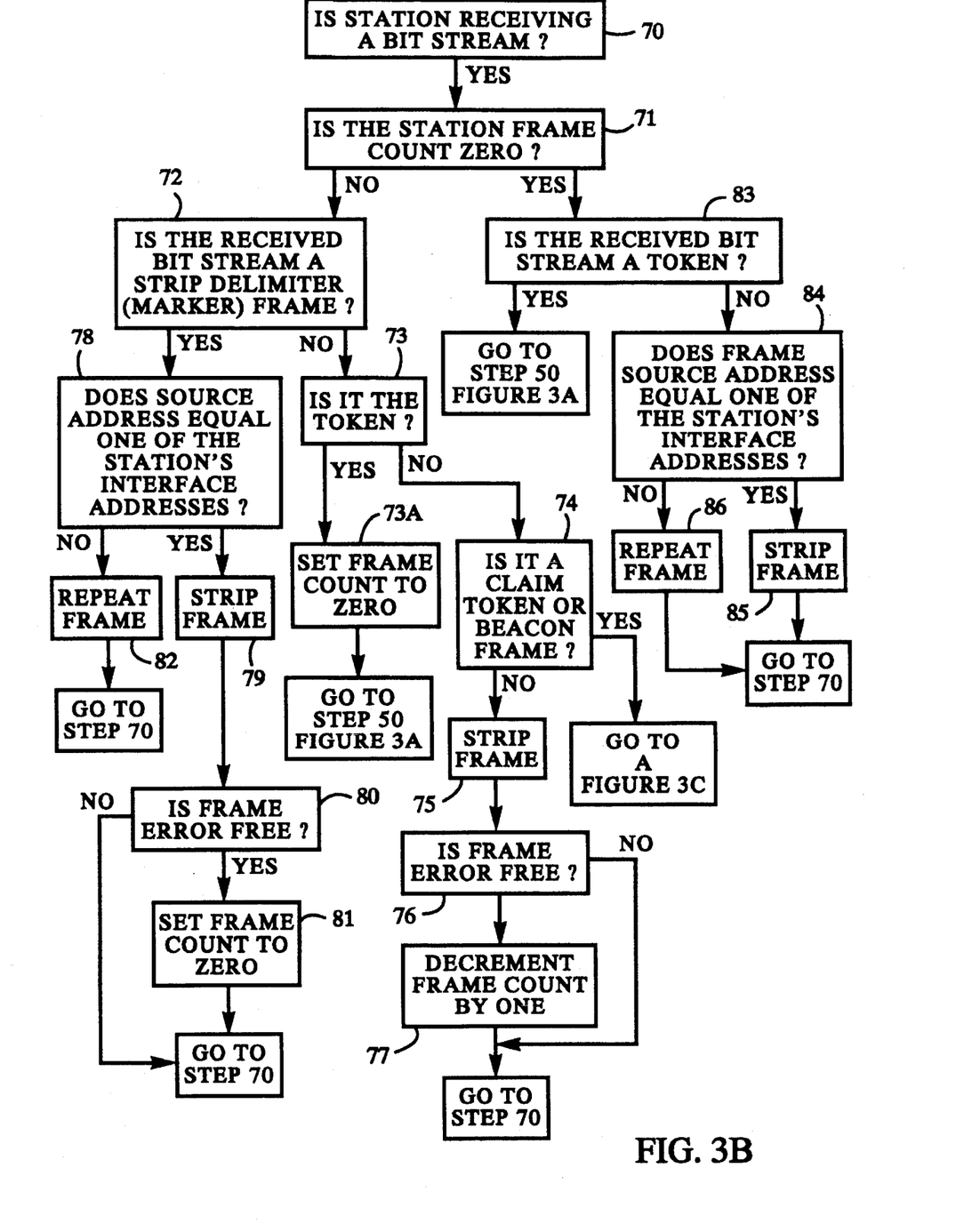
Figure 3C:
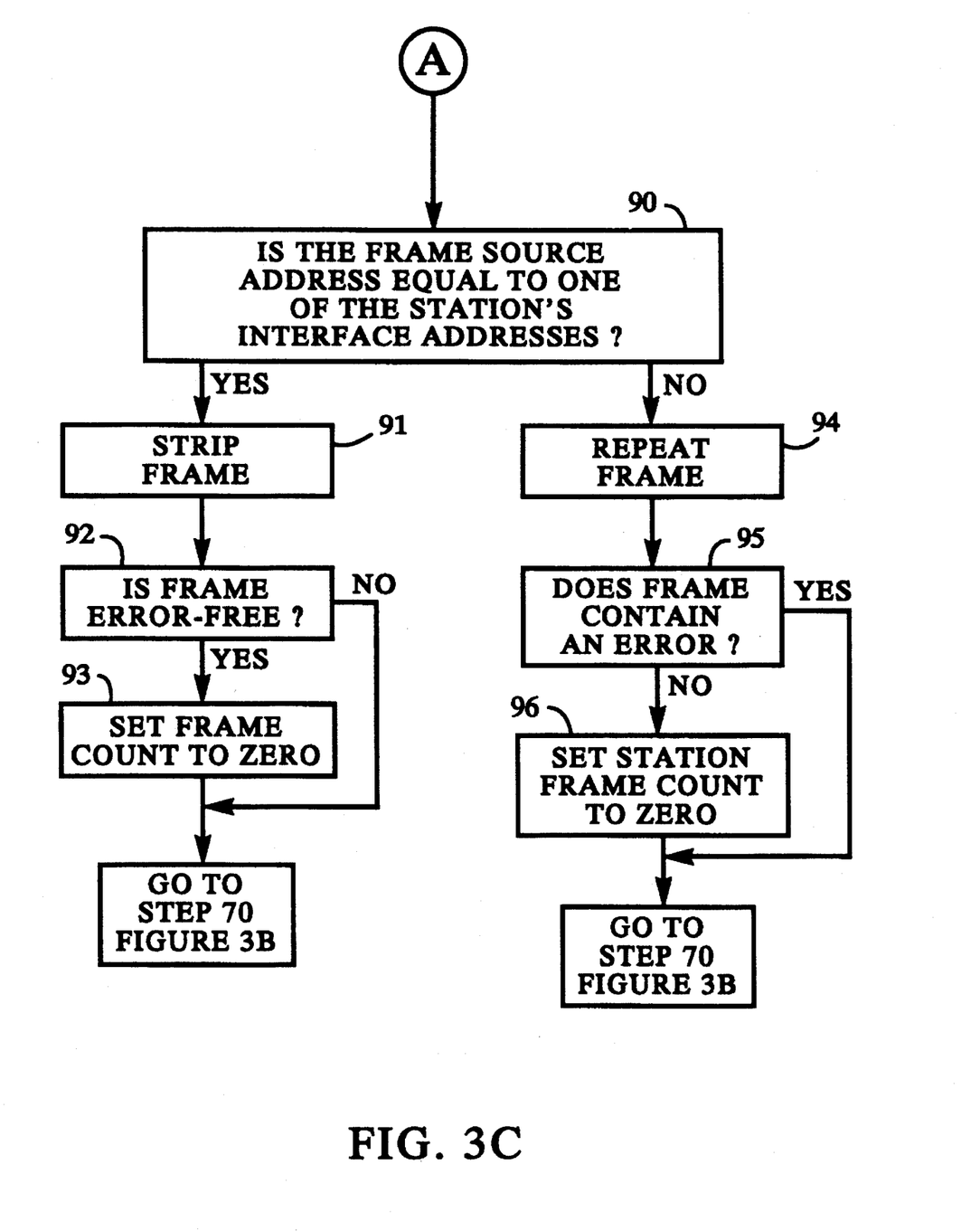

More specifically, with reference to FIG. 3B, when the bridge 15 receives a bit stream over the ring 10, it first checks its internal frame count to determine if it is equal to zero (steps 70–71). If the count is non-zero, the bridge 15 checks the information it is receiving over the network for the presence of a strip delimiter frame, the token, or a frame indicating a network error condition, that is, a claim token frame or a beacon frame (steps 72–74), any of which may result in the bridge not starting, or discontinuing, its frame stripping operation. If the information is not any of the above, the bridge strips it, without comparing the source address with any address list. The bridge 15 then decrements its internal frame count by one for each error-free frame stripped from the ring 20 (steps 76–77).

The bridge continues to so strip all the frames it receives on ring 20, until it encounters a delimiter frame, the token, or a claim token frame or a beacon frame, or its frame count is reduced to zero, for whatever reason, for example, during a frame stripping operation or during station re-initialization. The bridge may be receiving frames on a ring while it is in the act of transmitting frames on that ring. Thus the count must be incremented and decremented such that the count will accurately reflect the number of frames transmitted for which a corresponding frame has not yet been stripped, that is, if five frames have been transmitted and three stripped, the count should be two. In the preferred embodiment the count is incremented and decremented at the end of each of the frames to ensure that the count is accurate. Accordingly, the count is never reduced below zero.

Errors in a frame may indicate a problem with a station 21 or communications link 22. Thus the bridge's internal frame count is not reduced for the stripping of an erroneous frame or frame fragments. To determine if a stripped frame is error-free the bridge 15 first checks that the frame is a full, or valid, frame and not just a frame fragment. The count will not be decremented for a fragment. If the frame is a valid frame, the bridge then uses the frame check sequence 45 and the frame status flags 46B (FIG. 2) to check for errors.

Before the bridge 15 strips a frame from the ring 20, it examines the frame to determine if it is a strip delimiter frame, either its own or one from another station (steps 72 and 78). If the frame is another station's strip delimiter frame, the bridge repeats it without altering the internal frame count (steps 78 and 82). The strip delimiter frame then travels around the ring 20 until it returns to the originating station 21 which strips it.

If the frame is the bridge's own strip delimiter frame, which signifies the end of the transmission, the bridge 15 strips it (steps 78–79). If the strip delimiter frame is error-free the bridge 15 stops stripping the frames it receives over the ring 20, even if the internal frame count indicates that all the transmitted frames have not been stripped, and it resets the internal frame count to zero (steps 80–81). The bridge 15 will thereafter strip only its own strip delimiter frames or frames with its station-address as the source address, repeating all the other frames, until the internal frame count is again non-zero indicating a bridge 15 transmission (steps 83–86).

The internal count is set to zero when the bridge 15 detects its own strip delimiter frame, as set forth above, to prevent the bridge 15 from stripping frames originated by another station 21 on the ring 20. Thus even if several of the bridge's frames are erroneously stripped by another station 21, and its count is non-zero when it receives its delimiter frame, the bridge will correctly stop stripping.

Before stripping, the bridge also checks if the received information is the token. Reception of the token indicates that the frames transmitted by the bridge have all been stripped, even the bridge's strip delimiter frames. The bridge will thus stop stripping and set its count to zero to prevent it from stripping another station's frames thereafter transmitted over the network.

The bridge 15 also stops stripping frames when the network is operating in error detection and recovery mode, indicated by the receipt of error-free claim token or beacon frame (step 90–96). If the bridge 15 does not stop stripping frames during error detection and recovery operation, downstream stations would not receive the frames required for network re-initialization. Thus, upon receipt of an error-free claim token frame or a beacon frame the bridge goes into error detection and recovery mode operation as defined by the token ring protocol. Upon receipt of erroneous claim token or beacon frames, the bridge 15 repeats the frames if the source address is not one of its own addresses or otherwise strips it, and then continues its frame stripping operation (steps 90–96).

Using the strip delimiter frame and the count to indicate when to start and stop stripping frames enables a network to be served by more than one bridge, thus improving network throughput, flexibility and availability. For example, if one path between a source station and a destination station is broken or congested, another path, connected by one or more bridges may be used. The scheme places no topological restrictions on the networks, and thus, two networks may be interconnected by redundant bridges.

Without using the strip delimiter frame and/or the count, a bridge on the second path strips frames based only on the source address, and if it "recognizes" the source address in the frames as identifying one of the stations from which it normally copies frames, it may strip the frames, preventing them from reaching the intended destination. Thus, a network may not be served by redundant bridges. However, if the bridge is using the strip delimiter frames and frame count, it will not strip the frames, regardless of the source addresses in the frames, unless the addresses match the bridge's own station-address. Thus there is no limit on the number of stations whose frames may be transmitted by a given bridge or on the number of bridges in any network because frame stripping is independent of the frame source address.

Using the strip delimiter frame to indicate the end of a transmission, as opposed to setting a flag or changing the contents of a frame field has several additional advantages. For example, the strip delimiter frames uniquely identify their source station, while the frame indicators do not. Thus a strip delimiter frame which is not lost will eventually return to the originating station, signifying a potential network error condition if none of the other transmitted frames return to the station. This occurs even if another station is in the process of erroneously stripping another station's frames when it receives the delimiter frame.

Additionally, each strip delimiter frame may be error protected by its own frame check sequence 45 (FIG. 2), while using the other indicators requires the bridge to recalculate and replace the frame check sequence 45 and/or other fields in one or more data frames. For robustness to errors, multiple strip delimiter frames may be used to indicate the end of a transmission. In this way the bridge 15 is likely to receive one recognizable strip delimiter frame even if one or more delimiter frames are lost or corrupted.

Using either the strip delimiter frame or the internal count alone allows stations to correctly strip frames without reference to the frame source address, thus achieving some of the advantages set forth above. However, using both the strip delimiter frame and the frame count gives the frame stripping operation an even further robustness to errors. If all the strip delimiter frames are corrupted or lost, the bridge will strip frames only until its count is reduced to zero. Thus, at most, a relatively small number of frames which the bridge did not transmit will be stripped. If only a flag in one of the transmitted frames is used to indicate the end of a transmission and the frame containing the flag is lost or corrupted, many frames not transmitted by the bridge may be stripped.

Alternatively, the bridge may under-strip if only the flag is used to indicate the end of stripping. An error in one of the data frames may result in the frame's flag appearing set, the type of error which is not typically protected by the frame check sequence, and the bridge then stops stripping. Errors in the strip delimiter frames will not result in understripping because such erroneous frames do not signal the bridge to stop stripping.

It will be appreciated by those skilled in the art that any station, not just bridge-stations, may use the internal frame count and/or strip delimiter frames to determine when to start and stop stripping frames. Using the frame count and the strip delimiter frames enables a station to use relatively fast and yet simple circuitry to control its frame stripping operation, particularly if the station is associated with a large number of addresses.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A station for connection to a computer network, comprising:

A. transmitting means for transmitting on the network a number of information frames, followed by a number of strip delimiter frames;

B. stop condition detecting means for indicating the occurrence of any of a number of predetermined conditions for stopping a stripping operation; and     C. frame stripping means for stripping from the network information frames received during a time period which begins no later than when the transmitting means begins transmitting information frames, and which ends when any stop stripping condition is indicated by the stop condition detecting means after the transmitting means has completed transmitting the information frames and at least one strip delimiter frame;

D. wherein the stop condition detecting means includes means for indicating the occurrence of a stop stripping condition when a predetermined number of strip delimiter frames is received by the station over the network.

2. A station according to claim 1 wherein:

the transmitting means includes in the transmitted strip delimiter frames a source address field identifying said station as the source of the strip delimiter frames;

the station further comprises means for determining whether the source address field of a received frame identifies said station as the source; and the stop condition detecting means indicates the occurence of a stop stripping condition in response to the receipt of a strip delimiter frame only if said source address determining means determines that the source of said strip delimiter frame is said station.

3. A station according to claim 2, wherein:

the frame stripping means forwards onto the network any strip delimiter frame whose source is determined by the source address determining means to be a station other than said station.

4. A station according to claim 1, wherein:

the transmitting means includes within the transmitted frames a source address field identifying said station as the source of the transmitted frames;

the station further comprises means for determining whether the source address field of a received strip delimiter frame identifies said station as the source; and the frame stripping means further includes means for stripping from the network all frames whose source is determined to be said station by the source address determining means, independent of whether the stop condition detecting means has indicated the occurence of a stop stripping condition.

5. A station according to claim 1, wherein:

the transmitting means transmits a token after it transmits said strip delimiter frames, and the stop condition detecting means further includes means for indicating the stop stripping condition when a token is received by the station over the network.

6. A station according to claim 5, wherein the stop condition detecting means further includes means for indicating the stop stripping condition when a frame indicating a network error condition is received by the station over the network.

7. A station according to claim 1, wherein the stop condition detection means does not respond to any strip delimiter frame received by the station unless the strip delimiter frame is error-free.

8. A station according to claim 1 wherein said predetermined number of strip delimiter frames is one frame.

* * * * *